March 12, 1968     W. R. HOWARD     3,372,432

EXTRUSION DIE

Filed June 21, 1966

BY *Young + Quigg*

ATTORNEYS

United States Patent Office 3,372,432
Patented Mar. 12, 1968

3,372,432
EXTRUSION DIE
Warren R. Howard, Beverly, N.J., assignor to Wall Industries, Inc., a corporation of Delaware
Filed June 21, 1966, Ser. No. 559,176
7 Claims. (Cl. 18—8)

This invention relates to extrusion dies.

Heretofore individual plastic filaments have been melt extruded so closely together that upon leaving the extrusion die they touch one another because of normal expansion caused by leaving the high pressure environment within the extrusion machine. Because of this touching in a heated state, the individual filaments fuse to one another thereby forming an integral ribbon. Heretofore it has been very difficult to dispose the outlet ends of the extrusion orifices of the extrusion die close enough together so that substantially any polymer that is extruded through the die will swell sufficiently upon leaving the die to cause touching of the individual filaments. This problem was caused partly because the inlet ends of the extrusion orifices are generally larger than the outlet ends and the extrusion orifice itself is thereby tapered downwardly from the large inlet end to the small outlet end. Because of the large inlet end of the extrusion orifices it has been extremely difficult to dispose the outlet ends of the extrusion orifices close together without substantially weakening the die itself by placing the large inlet ends of the extrusion orifices too close to one another.

According to this invention the outlet ends of the extrusion orifices are placed closer together in the die than was heretofore possible despite the enlarged inlet ends and without weakening the die itself by providing a die wherein the outlet ends are in alignment and the main passageway of each extrusion orifice is tilted away from that alignment so that each main passageway tilts in a direction opposite from the main passageway of the extrusion orifices that are disposed adjacent to and on opposite sides of each main passageway.

Accordingly, it is an object of this invention to provide a new and improved extrusion die.

Other aspects, objects, and the several advantages of this invention will be apparent to those skilled in the art from the description, drawings, and appended claims.

Figure 1:
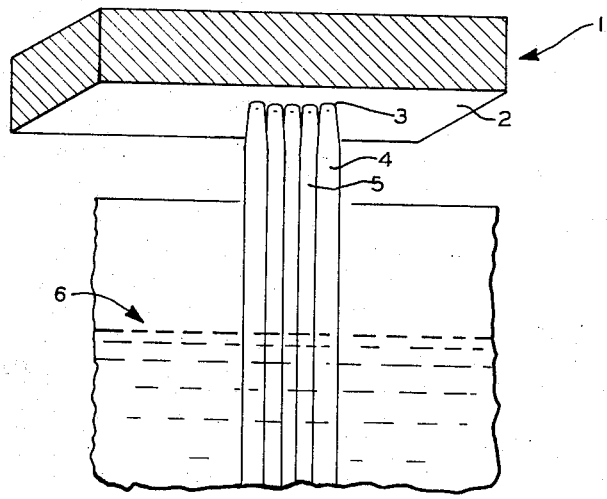
FIGURE 1 shows a process employing the die of this invention.

In FIGURE 1 there is shown a die 1 and the bottom surface 2 thereof which contains a plurality of adjacent but spaced apart, individual, aligned extrusion orifices represented by the outlet end 3 of those orifices. Individual polymer filaments are made by extruding filament forming material through the orifices and out the outlet end 3. After leaving the die, filaments 4 contact one another at the interface 5 while in a heated condition and therefore fuse to one another before being cooled by entering quench bath 6. Thus, an integral ribbon composed of a plurality of fused, individual filaments formed by die 1 is recovered from bath 6.

Figure 2:
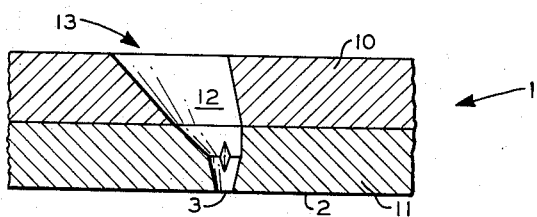
FIGURE 2 shows a cross sectional view of the die of FIGURE 1.

FIGURE 2 shows the die of FIGURE 1 to be composed of an approach plate 10 and a die plate 11. The die can be made of a single plate if desired. The extrusion orifice contains the main passageway 12 which is terminated by outlet end 3 and inlet end 13, inlet end 13 being connected to the internal space of the extrusion machine.

Figure 3:
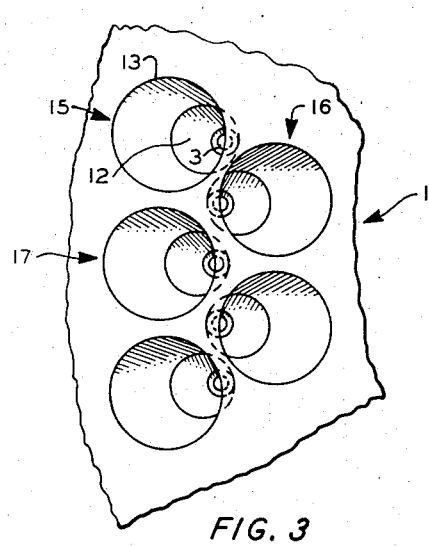
FIGURE 3 shows a top view of the die of FIGURE 2.

FIGURE 3 shows die 1 from the top looking first at the inlet end 13, through main passageway 12, and at a portion of outlet end 3. Since the main passageway 12 is tilted away from the alignment in which the outlet ends 3 are disposed, only a portion of outlet 3 is seen when viewed through inlet 13. It can be seen from FIGURE 3 that the passageways of each extrusion orifice are tilted in a direction opposite to the tilt direction of the adjacent extrusion orifice's main passageway. Thus, the main passageway of extrusion orifices 15 and 17 tilt to the left of FIGURE 3 whereas the intermediate extrusion orifice 16 tilts to the right. By the tilting of alternate main passageways, space is obtained for the larger inlet end without weakening the die because the inlet ends need not be placed so close together that there is too little die material between adjacent inlet ends.

Figure 4:
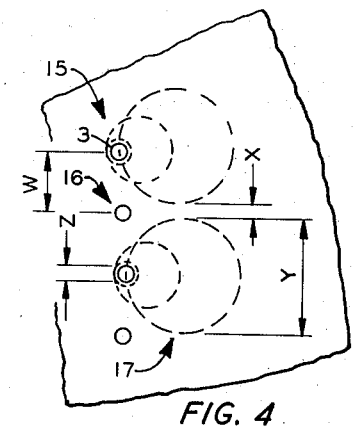
FIGURE 4 shows a bottom view of the die of FIGURE 2.

FIGURE 4 shows a bottom view of the die of FIGURE 3 thereby showing first the outlet ends 3 of the extrusion orifices. Because of the opposite tilting of adjacent main passageways of the extrusion orifices enough die material can be maintained in the space X to prevent weakening of the die notwithstanding that the dimension Y of the inlet end 13 is substantially greater than the dimension Z of the outlet end and also greater than the dimension W between extrusion orifices 15 and 17 which are adjacent to and on opposite sides of extrusion orifice 16.

The die of this invention can be formed from any conventional die material such as steel and the like and can be employed on any conventional filament extrusion apparatus.

The die of this invention can be employed to make ribbons or articles of similar configuration from substantially any known melt extrudable polymer. Suitable polymers include those of 1-olefins, polyamides, polyesters, acrylic polymers, polyvinyl chloride, and also rubbery polymers such as ethylene-propylene rubbers, and rubbers formed from one or more conjugated dienes or one or more conjugated dienes with monovinyl substituted aromatics and similar compounds.

The alignment of the outlet ends of the extrusion orifices of the die of this invention can vary widely from a single straight line to a plurality of joined straight lines oriented at an angle to each other or a curvilinear, e.g., sinusoidal, configuration as well as a hemispherical or substantially circular configuration. As an example of the advantage of this invention that the greatest number of outlet orifices per unit length of die is obtained without the overlapping of the large inlet ends of those orifices, for 600 to 700 denier filament formed from a foamed plastic filament, each outlet end would have a diameter Z (FIGURE 4) of about 0.04 inch whereas the corresponding inlet end would have a diameter Y of about 0.1 inch. By the main passageway tilting concept of this invention 0.01 inch of die material can be disposed between the inlet orifices, dimension X of FIGURE 4, thereby providing for a strong die which would not be achieved if the main passageways of the extrusion orifices were not tilted since without tilting the inlet end of the orifices would overlap one another and thereby weaken the mechanical structure of the die.

The area covered by the inlet end 13 can have a diameter Y greater than the dimension W (distance between midpoints of adjacent outlet ends) of FIGURE 4 but also can be equal to that distance, the term "diameter" not being limited to circular inlets but merely denoting the distance across the inlet irregardless of its cross sectional configuration and the term "about equal" including dimensions less than dimension W but still close enough to dimension W to cause a weakened die to be formed. The angle through which each individual main passageway tilts away from the alignment of the outlet ends of the extrusion orifices will vary widely depending primarily upon the size of the inlet ends 13. Generally, the extent of tilting of the main passageways is that sufficient to allow the presence of the large inlet ends in the die without the inlet ends being close enough to one another to structurally weaken the die.

Reasonable variations and modifications are possible within the scope of this disclosure without departing from the spirit and scope thereof.

I claim:

1. In an extrusion die having a plurality of adjacent but spaced apart, individual, extrusion orifices, each of said orifices comprising a main passageway terminated by an inlet end on one side of the die and an outlet end on a different side of said die, the improvement comprising said inlet end of each orifice having a diameter at least about equal to the distance between the midpoints of adjacent outlet ends of the orifices, the main passageway of each orifice being tilted away from its outlet end in a manner such that each main passageway tilts in a direction opposite from the main passageway of the orifices that are disposed adjacent to and on opposite sides of said each main passageway.

2. The die according to claim 1 wherein said area of said inlet end of each orifice is also larger than the corresponding outlet end of each orifice.

3. The die according to claim 1 wherein the extent of tilting of said main passageways is that which is sufficient to allow the presence of said large inlet end in said die without adjacent inlet ends being close enough to one another to structurally weaken said die.

4. The die according to claim 1 wherein the inlet ends of each extrusion orifice are thereby out of alignment with their corresponding inlet ends in a direction opposite to the direction by which the inlet ends of the orifices that are adjacent and on opposite sides of said each orifice are out of alignment.

5. The die according to claim 1 wherein the alignment of said outlet ends is in a substantially straight line.

6. The die according to claim 1 wherein said alignment of said outlet ends is curvilinear.

7. The die according to claim 6 wherein said curvilinear alignment is round thereby defining a cylindrical shape.

References Cited

UNITED STATES PATENTS

| | | | |
|---|---|---|---|
| 2,440,761 | 5/1948 | Sisson et al. | 18—85 |
| 3,006,028 | 10/1961 | Calhoun | 18—82 |
| 3,266,087 | 8/1966 | Opfell et al. | 18—855 |

WILLIAM J. STEPHENSON, *Primary Examiner.*